United States Patent [19]

Ono et al.

[11] 4,444,462
[45] Apr. 24, 1984

[54] PICTURE IMAGE OBSERVATION SYSTEM

[75] Inventors: Kimizo Ono; Yoshikazu Nishiwaki; Koichi Tsuno; Tohru Iwai; Mitsuru Nishikawa, all of Osaka, Japan

[73] Assignee: Sumitomo Electric Industries, Ltd., Osaka, Japan

[21] Appl. No.: 297,177

[22] Filed: Aug. 28, 1981

[51] Int. Cl.³ .............................................. G02B 5/17
[52] U.S. Cl. ..................... 350/96.25; 128/6; 350/96.26; 350/429; 350/587
[58] Field of Search ................... 128/4, 6, 7, 8, 9, 395, 128/396, 397, 398; 350/96.24, 96.25, 96.26, 423, 429, 581, 583, 587

[56] References Cited

U.S. PATENT DOCUMENTS

| | | | |
|---|---|---|---|
| 2,987,960 | 6/1961 | Sheldon | 350/96.25 X |
| 3,561,432 | 2/1971 | Yamaki et al. | 128/6 |
| 3,818,902 | 6/1974 | Kinoshita et al. | 128/6 |
| 3,856,000 | 12/1974 | Chikama | 128/6 |
| 4,042,823 | 8/1977 | Decker et al. | 350/96.26 X |
| 4,286,839 | 9/1981 | Ilzig et al. | 350/96.24 |

FOREIGN PATENT DOCUMENTS 777621  11/1980  U.S.S.R. ............................ 350/96.26

*Primary Examiner*—John D. Lee

[57] ABSTRACT

A protective lid is provided in front of an image-forming lens mounted on the forward end of a picture image transmission line which comprises plural optical fibers bundled in alignment to be remotely controlled from the back end of the transmission line for opening/closing so that the image-forming lens may be protected from particles, vapor or poisonous gas when the transmission line is used in such atmosphere, thereby preventing deterioration of the quality of picture images to be formed.

7 Claims, 7 Drawing Figures

PICTURE IMAGE OBSERVATION SYSTEM

FIELD OF THE INVENTION

The present invention concerns a picture image observation system comprising a plural number of optical fibers bundled in alignment which is capable of focusing a picture image of an object located in front thereof at the forward end of said plural fiber bundle and of observing the picture image magnified by a magnifying lens which is transmitted through said optical fiber bundle at the backend thereof.

BACKGROUND OF THE INVENTION

Picture image observing systems are generally of the type wherein a plural number of optical fibers each of which constitutes a picture element are bundled in alignment so that a picture image of an object is focused by means of an image-forming lens at the forward end of the optical fiber bundle, and transmitted through and enlarged by the magnifying lens of an eyepiece or the like at the back end thereof to be inspected. Since the device in such a system is extremely small in diameter and flexible in materials, it has been applied to a wider scope of the fields from industrial applications in various pipes such as heat conductive pipes used in heat exchangers at a chemical plant or a nuclear plant or a steel mill and medical applications to examine inside of a body such as cardiocameras or gastrocameras to civil usages such as security cameras or devices for monitoring dead angles in automobiles. The scope of application will not be limited to the present use but will extend further. One of the viable applications in the future will be to examine atmosphere filled with particles or volatile gases. Unlike conventional TV monitoring systems, this system is completely free of the possibility to trigger electric sparks which might cause an explosion and endanger workers.

However, if the conventional system is used, in which an image-forming lens and the protective filter therefor are mounted without covers on an adaptor on the tip and are passed through the atmosphere of particles, vapor or poisonous gas, they tend to adhere on the surfaces of the image-forming lens and the protective filter, thereby causing deterioration of picture quality and/or chemically damaging the image-forming lens and the protective filter.

SUMMARY OF THE INVENTION

The present invention aims at eliminating the aforementioned inconvenience and defects of the prior art by providing a protective device for the image-forming lens which is operable by a remote control mechanism at the tip of the picture image observation system.

Due to the above mentioned arrangement according to the present invention, even if the picture image observation system is made to pass through particles, vapor or poisonous gas, the image-forming lens will not be affected and can transmit superior picture images.

BRIEF DESCRIPTION OF THE ATTACHED DRAWINGS

DETAILED DESCRIPTION OF PREFERRED EMBODIMENTS

Figure 1:
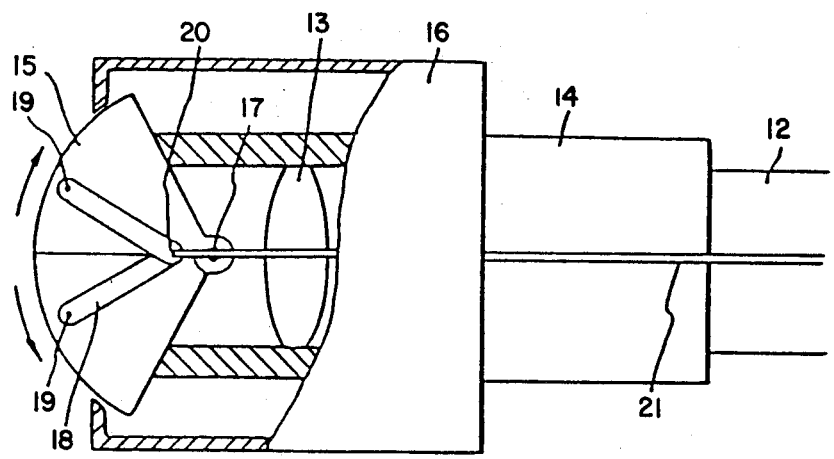
FIG. 1 is a cross-sectional view to show the basic structure of an embodiment of the picture image observation system according to the present invention.
Figure 2:
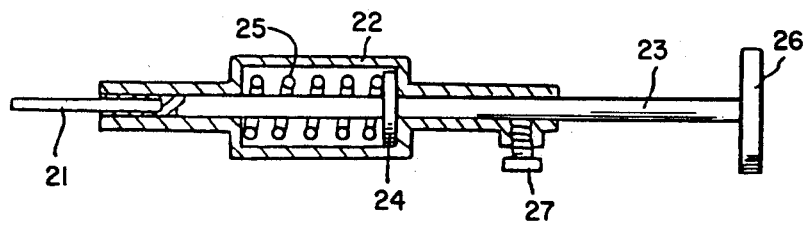
FIG. 2 is a cross-sectional view of an embodiment of a remote control means on the back end thereof.

Referring to FIGS. 1 and 2, explanation will now be given to an embodiment of this invention. An image transmission line 11 not shown in FIGS. 1 and 2 comprises thousands to tens of thousands of optical fiber elements bundled in alignment (refer to FIGS. 4 and 6) and is protected by an outer sheath 12. On an incident end of the image transmission line 11 is integrally mounted a cylindrical adaptor 14 incorporating an image forming lens 13 which focuses a picture image of an object positioned in front of a plane of incidence of the line 11. The adaptor 14 is mounted integrally with a cylindrical cover 16 which surrounds the tip end thereof and which houses a pair of open/close lids 15 (which will be described hereinafter). Said lids 15 are fixed on one end thereof in a freely rotatable fashion on a pair of pins 17 which are projected on the outer periphery of the adaptor 14 at the interval of 180° on a straight line. In other words, the lids 15 are adapted to rotate around the pins 17 respectively to close the aperture at the end of the adaptor 14. A pair of links 18 for opening/closing are attached to the lids 15 on one end thereof via pins 19 respectively and are connected to each other on the other end via a pin 20. The pin 20 is also connected to the forward end of a wire cable 21 which extends along the image transmission line 11. The back end of the wire cable 21 is mounted integrally on a rod 23 which is fixed on a holder 22 in a slidable manner. Inside the holder 22 is housed a compression coil spring 25 which abuts against a flange 24 formed on the rod 23 so as to constantly force the rod 23 toward the right as in FIG. 2. Therefore, if the top 26 of the rod 23 is forced toward the holder 22 against the force of the compression coil spring 25, the wire cable 21 is made to move toward the left as in FIG. 1, which in turn makes the lids 15 rotate around the pin 17 via links 18 to open apart. In this embodiment, the lids can be kept open by means of a screw 27 which is conveniently provided on the holder 22 without continuously pushing the top 26 of the rod 23. When the screw is loosened, the rod 23 is pushed back toward the right by the force of the compression coil spring 25, thereby automatically closing the lids 15 via the wire cable 21 and the links 18.

Although the wire cable 21 is employed in this embodiment as a remote-control means, it is naturally possible to use hydraulic or pneumatic pressure or other fluid pressures. It may also be an electrical remote-control means unless the picture image observation system is used in an explosive atmosphere. For instance, the remote-control means may be a fluid pressure cylinder which is coupled with the adaptor 14, provided with a piston rod connected to the pin 17, and coupled with a source of pressure which is operated on the back side of the transmission line 11 with a pipe extending along the line 11. Alternatively, a motor may be coupled with the pin 17 to mechanically open/close the lids 15 and the motor is connected to a switch via a power source, the switch being operable on the back end of the image transmission line 11. The configuration of the lids 15 is not limited to the one shown in the figure of the embodiment.

Figure 3:
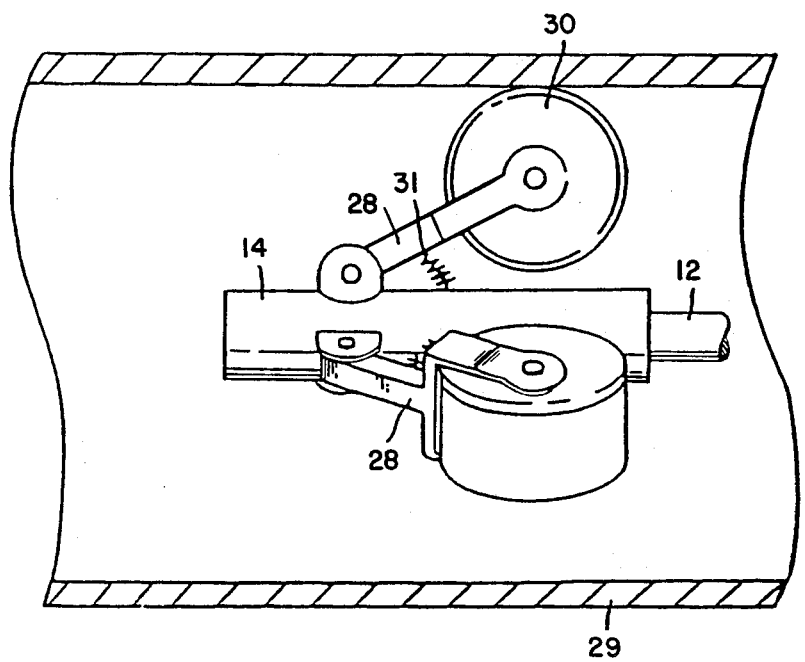
FIG. 3 is a frontal view to show the outer appearance of an embodiment of the picture image observation system according to the present invention incorporating a travelling device and FIG. 4 is a right side view thereof.
Figure 4:
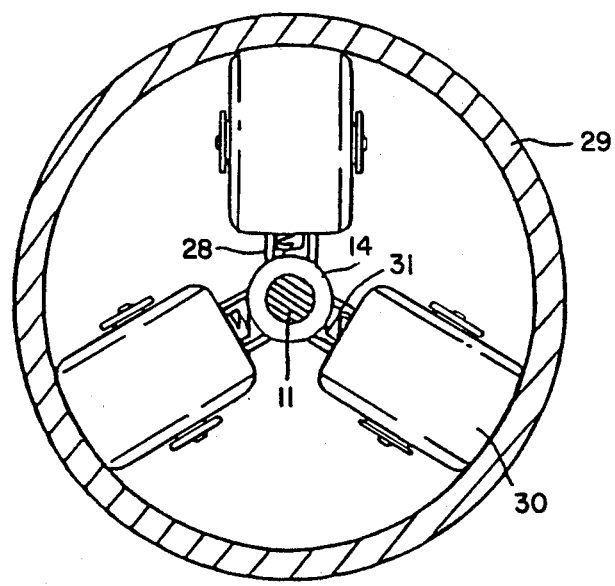

Another embodiment incorporating a travelling device inside a pipe 29 will now be described referring to FIGS. 3 and 4. In the above two figures the lids 15 and the cover 16 are omitted. On the outer periphery of the adaptor 14 are radially-journalled bases of three arms 28 at equal intervals. The ends of the arms 28 are forked so as to hold wheels 30 between them in a rotatable fashion which abut rollingly on the pipe wall. Spring members 31 are interposed between the arms 28 and the adaptor 14 for forcing the wheels 30 against the inner wall of the pipe 29. An outer rotor motor (not shown) is attached coaxially to one of the wheels 30 in order to drive and rotate the wheels 30, thereby making the wheels 30 travel along the pipe 29 by means of friction. A wheel 30 is mounted on a revolving rotor on the outer periphery thereof to have an outer diameter identical to that of the other wheels. The outer rotor motor is adapted to be remote-controlled by an electric control line (not shown) which extends along the image transmission line 11. The mechanism to drive the wheels 30 is not limited to the outer rotor motor but may be a motor which is directly provided with wheels on the shaft thereof, a motor attached to an arm 28 for rotating the shaft of the wheels 30 via worm-gears or any other mechanism so far as it can drive the wheels 30. Due to such an arrangement, the tip end of the image transmission line 11 can be made to travel along the pipe 29 irrespective of the inclination thereof and even if there are bent, enlarged, or narrow portions in the pipe path.

Figure 5:
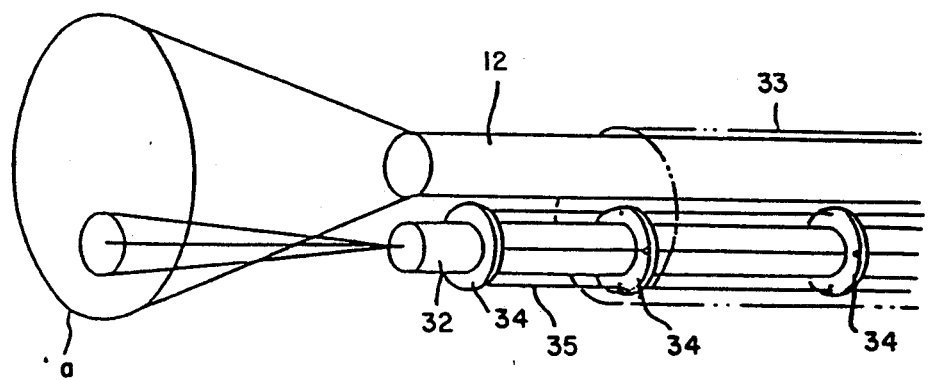
FIG. 5 is a perspective view of the outer appearance of another embodiment of the picture image observation system according to the present invention provided with a light guide.

Another embodiment incorporating a directional light device will be described hereinafter referring to FIG. 5 wherein the adaptor 14 is omitted. A guide 32 for a spotlight comprising a plural number of optical fibers in a bundle is provided in parallel to the image transmission line 11. The guide 32 and the line 11 are housed in a protective sleeve 33. Plural flanges 34 are mounted on the outer periphery of the guide 32 at uniform intervals. Four wire cables 35 are fixed at one end thereof to the flange 34 which is closest to the tip end of the guide 32 at uniform intervals and are guided to penetrate other flanges toward the other end of the guide 32 which is connected with a light source (not shown). Although four wire cables are used in this embodiment, the direction of the light emitted from the tip end can be guided in an arbitral direction by means of at least three cables. In this embodiment, as a portion of the image pickup zone a by-the-line 11 is spotlighted by means of the guide 32, the picture image of that zone can be made remarkably brighter. The position of the light can be arbitrarily directed by relatively altering the tension of the wire cables 35.

Figure 6:
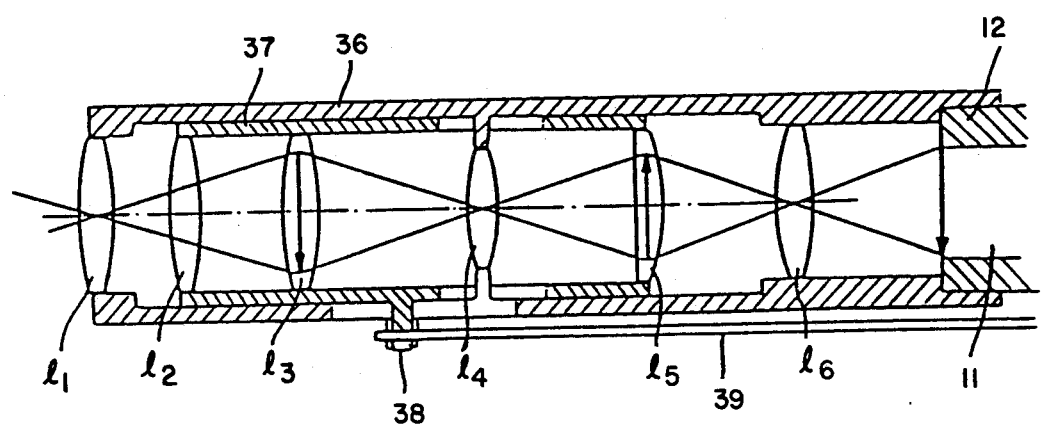
FIG. 6 is a cross sectional view to illustrate the basic structure of still another embodiment of this invention incorporating a zoom lens.
Figure 7:
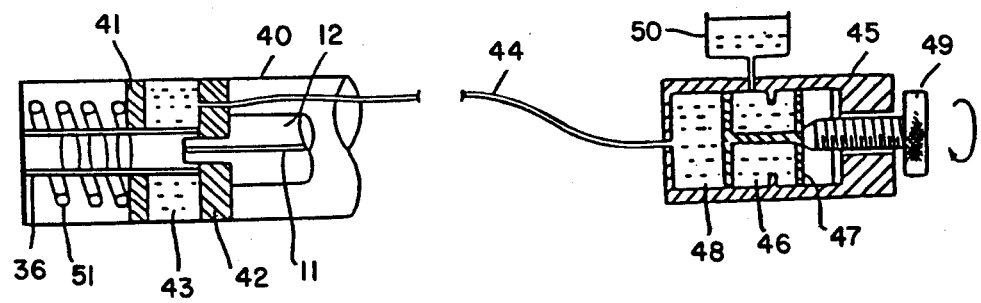
FIG. 7 is a view to illustrate the principle of hydraulic mechanism of an embodiment of the remote control operation means for the zoom lens.

Still another embodiment of this invention will now be explained referring to FIG. 6. An adaptor 36 mounted on the forward end of the image transmission line 11 is fixedly provided with lenses $l_1$, $l_4$ and $l_6$. Between the lens $l_1$ and the lens $l_6$ is slidably engaged a cylinder 37 which houses lenses $l_2$, $l_3$ and $l_5$ for changing magnification. A metal lock 38 is mounted integrally on the cylinder 37 so as to project through the adaptor 36 and is connected to the wire cables 39 on the forward end thereof which extend along the image transmission line 11. By manipulating the wire cables at the back end of the transmission line 11, the slidable cylinder 37 can be made to slide through the adaptor 36 to change the magnification of a picture image. Although lids and other devices are also mounted on the tip end of the adaptor 36, they are omitted in the drawing. Various means may be used as the remote-control mechanism for the slidable cylinder 37. For instance, as shown in FIG. 7, the adaptor 36 is covered by an outer sheath 40, and a piston 41 is slidably interposed between the outer sheath 40 and the adaptor 36, the piston 41 being integrally coupled with said metal lock 38, so as to form a hydraulic chamber 43 between the piston 41 and a partition wall 42 coupled with the adaptor 36. A hydraulic pipe 44 is made to penetrate through the hydraulic chamber 43 along the image transmission line 11. A cylinder 45 mounted on the back end of the transmission line 11 houses a piston 47 which forms a hydraulic chamber 46. Another hydraulic chamber 48 is formed between one end of the piston 47 and the cylinder 45 thereby the hydraulic pipe 44 is guided through the chamber 48. The other end of the piston 47 abuts against one end of an adjustment screw 49 which is screwed in the cylinder 45. Said hydraulic chamber 46 is filled with oil fed from an oil tank 50. The reference numeral 51 denotes a compression coil spring interposed between the end surface of the outer sheath 40 and the end surface of the piston 41 which forces the piston 41 against the pressure of oil in the hydraulic chamber 43. A picture image can be zoomed simply by changing the screwed portion of the adjustment screw 49. When the adjustment screw 49 is pushed in further, the piston 47 is pushed forward to make the pressure in the hydraulic chamber 43 rise via the hydraulic pipe 44, which in turn pushes the piston 41, thereby holding the piston 41 and the slidable cylinder 37 at a position where the pressure of the hydraulic chamber 43 and the spring force of the compression coil spring 51 become balanced. A user can therefore first detect an object in a narrow path and then zoom it up for closer observation using this system. It is naturally possible to combine the aforementioned embodiments and construct a picture image observation system.

We claim:

1. A picture image observation system of the type comprising an image transmission line of plural optical fibers bundled in alignment; an image-forming lens housed in a cylindrical adaptor mounted on the forward end of said transmission line which focuses a picture image of an object located in front thereof on the forward end surface of said image transmission line; a magnifying lens provided on the back end of said transmission line which is used for observing said picture image which is transmitted thereto, said picture image observation system being characterized by an arrangement comprising a pair of protective lids which are rotatably mounted on a pair of pins projected from the tip end of said adaptor and which covers the front end of said adaptor; a pair of links for opening/closing which is fixed by pins on one end thereof to said lids; and a remote control means which extends along said image transmission line and which connects one end with the other end of said links so as to push/pull the lids from the back end.

2. The picture image observation system as claimed in claim 1 which is characterized by the remote control means comprising wire cables.

3. The picture image observation system as claimed in claim 1 which is characterized by the remote control means comprising a fluid pressure cylinder supported by the adaptor and coupled with the other end of the links; a fluid pressure source provided on the back end of the image transmission line; and a pipe path communicating said fluid pressure cylinder with said fluid pressure source.

4. The picture image observation system as claimed in claim 1 which is characterized by the remote control means comprising a motor supported by the adaptor and coupled with the other end of the links to drive said links for push/pull; a power source provided on the back end of the image transmission line; and a conductor which extends along said image transmission line and connects the said motor with said power source via a switch.

5. The picture image observation system as claimed in claim 1 which further comprises at least three arms provided around the adaptor at uniform intervals having bases which are supported rotatably on the adaptor; wheels which are mounted rotatably on the tip ends of said arms, at least one of said wheels being driven to rotate; and spring members which are interposed between said adaptor and said arms respectively which force said wheels against the inner wall of a pipe path at the end where the image transmission line is inserted.

6. The picture image observation system as claimed in claim 1 comprising a light guide which extends along the image transmission line, which is lit with light from the forward end surface for spotlighting a portion of the image forming zone of an object and which is connected on the back end with a light source; plural flanges integrally mounted on said light guide on the forward end part at intervals; and at least three wire cables provided around said light guide at uniform intervals and along thereto which are connected on one end to a flange which is closest to the forward end of said light guide and guided to penetrate through other flanges so that the direction of said light can be altered by varying the tension thereof from the back end.

7. The picture image observation system as claimed in claim 1 which is characterized by an image-forming zoom lens which can be adjusted for focal length thereof and by a remote control means provided along the image transmission line.

* * * * *